US007315227B2

(12) United States Patent
Huang et al.

(10) Patent No.: US 7,315,227 B2
(45) Date of Patent: Jan. 1, 2008

(54) GROUND FAULT CIRCUIT INTERRUPTERS PROVIDING END OF THE LIFE TEST

(75) Inventors: Huadao Huang, No. 58, Shahe Road, Jiangqiao Town, Jiading Borough, Shanghai (CN) 201803; Huayang Lu, Shanghai (CN)

(73) Assignee: Huadao Huang, Zhejiang Province (CN)

( * ) Notice: Subject to any disclaimer, the term of this patent is extended or adjusted under 35 U.S.C. 154(b) by 192 days.

(21) Appl. No.: 11/362,039

(22) Filed: Feb. 27, 2006

(65) Prior Publication Data

US 2006/0238933 A1 Oct. 26, 2006

Related U.S. Application Data

(60) Provisional application No. 60/656,090, filed on Feb. 25, 2005.

(51) Int. Cl.
*H02H 3/00* (2006.01)

(52) U.S. Cl. .............................. 335/6; 335/21; 335/35; 335/36

(58) Field of Classification Search .................... 335/6, 335/21, 24–26, 35, 36; 361/42–50
See application file for complete search history.

(56) References Cited

U.S. PATENT DOCUMENTS

| | | | |
|---|---|---|---|
| 4,386,338 | A | 5/1983 | Doyle et al. |
| 4,518,945 | A | 5/1985 | Doyle et al. |
| 4,595,894 | A | 6/1986 | Doyle et al. |
| 5,202,662 | A | 4/1993 | Bienwald et al. |
| 5,654,857 | A | 8/1997 | Gershen |
| 5,680,287 | A | 10/1997 | Gernhard et al. |
| 5,963,408 | A | 10/1999 | Neiger et al. |
| 6,040,967 | A | 3/2000 | DiSalvo |
| 6,052,265 | A | 4/2000 | Zaretsky et al. |
| 6,111,733 | A | 8/2000 | Neiger et al. |
| 6,226,161 | B1 | 5/2001 | Neiger et al. |
| 6,246,558 | B1 | 6/2001 | DiSalvo et al. |
| 6,252,407 | B1 | 6/2001 | Gershen |

(Continued)

*Primary Examiner*—Ramon M. Barrera
(74) *Attorney, Agent, or Firm*—Fei-Fei Chao; Andrews Kurth, LLP

(57) ABSTRACT

This invention discloses a ground fault circuit interrupter capable of detecting its end of life, and is characterized by: a pair of flexible metal sheets connected to the power output end are added on the circuit board of the interrupter, and there is a pair of moving contacts on the metal sheets; there are two pairs of fixed contacts on the power output conductors; the two pairs of fixed contacts on the power output conductors respectively correspond to the moving contacts on the power input metal sheets and the moving contacts on flexible metal sheets, thus forming two groups and four pairs of switches. There is also a tripping apparatus on the circuit board, which can release/trip the interrupter, thus cutting off the power output of the interrupter. An end of life detection circuit has also been added to the circuit board. After the interrupter is energized, various components in the interrupter are automatically detected. If it is found that the interrupter has come to the end of its life, the reset button will be prevented from resetting, so that neither the load end of the interrupter nor the power output holes on the surface of the interrupter have any power output. This invention has powerful applications, with sound safety precautions, thus effectively ensuring the personal safety of the user as well as the safety of the appliances.

15 Claims, 10 Drawing Sheets

U.S. PATENT DOCUMENTS

| | | | |
|---|---|---|---|
| 6,282,070 | B1 | 8/2001 | Ziegler et al. |
| 6,288,882 | B1 | 9/2001 | DiSalvo et al. |
| 6,309,248 | B1 | 10/2001 | King |
| 6,381,112 | B1 | 4/2002 | DiSalvo |
| 6,437,953 | B2 | 8/2002 | DiSalvo et al. |
| 6,469,881 | B2 | 10/2002 | Gershen et al. |
| 6,580,344 | B2 | 6/2003 | Li |
| 6,671,145 | B2 | 12/2003 | Germain et al. |
| 6,864,766 | B2 | 3/2005 | DiSalvo et al. |
| 6,963,260 | B2 | 11/2005 | Germain et al. |
| 7,019,952 | B2 | 3/2006 | Huang et al. |
| 7,049,910 | B2 | 5/2006 | Campolo et al. |
| 7,049,911 | B2 | 5/2006 | Germain et al. |

GROUND FAULT CIRCUIT INTERRUPTERS PROVIDING END OF THE LIFE TEST

RELATED APPLICATION

The present invention claims the priority of U.S. Provisional Application No. 60/656,090, filed on Feb. 25, 2005, which is herein incorporated by reference.

TECHNICAL FIELD

This invention involves a ground fault circuit interrupter. In particular, it refers to a ground fault circuit interrupter with the feature of being capable of automatically testing the ground fault circuit interrupter to ascertain whether it has come to the end of its life and of forcible and mechanical release, without the operation of any part.

BACKGROUND

With constant development of the ground fault circuit interrupter ("GFCI") industry, people have an increasingly higher demand for the usage safety of ground fault circuit interrupters, desiring that during the use of a ground fault circuit interrupter, when it comes to the end of its life and already loses its protective functions or its parts and accessories fail and do not work, the user can be reminded in a prompt manner to replace it with a new product. However, currently in the market, no ground fault circuit interrupter has been seen which is capable of stopping the reset button from being reset at the end of its life, so that the load output end of the ground fault circuit interrupter and the single phase, three line output plug hole on the surface of the interrupter are not energized, thus avoiding the occurrence of an accidental death by electrocution of the user in caused by a situation where a ground fault circuit interrupter has come to the end of its life, but where the load output end of the ground fault circuit interrupter and the single phase, three line output plug hole on the surface of the interrupter still have a power output, leading to a leak of electricity.

SUMMARY OF THE INVENTION

In view of the above, the main purpose of this invention is to provide a ground fault circuit interrupter capable of automatically testing the ground fault circuit interrupter to ascertain whether it has come to the end of its life without the operation of any part. When the interrupter has expired, it should be capable of preventing the reset button from being reset, so that the load output end of the ground fault circuit interrupter and the single phase, three line output plug hole on the surface of the interrupter are not energized, thus avoiding the occurrence of an accidental death by electrocution of the user caused by a situation where a ground fault circuit interrupter has come to the end of its life.

Another purpose of this invention is to provide a ground fault circuit interrupter capable of mechanical release. When a component in a ground fault circuit interrupter fails, the ground fault circuit interrupter may be mechanically caused to be tripped/released, thus forcibly cutting off its power output.

To achieve the aforementioned purposes, this invention uses the following technical solutions: a ground fault circuit interrupter providing end of life test, which consists of a housing and a circuit board installed inside the housing capable of achieving a ground fault circuit interrupter with/without power output and automatically testing whether the ground fault circuit interrupter has come to the end of its life.

Inside said housing and on both sides of the insulated middle support structure, a hot power line output conductor and a neutral power line output conductor are installed; on both ends of the power output conductors, at locations corresponding to the neutral line hole and hot line hole in the upper cover output plug hole described, there are flaky clamp winglets; on each power output conductor, there are two separate fixed contacts, thus forming two pairs of fixed contacts.

On the circuit board described, the following are installed: a pair of flexible neutral power lines, hot line input metal sheets, neutral lines, hot line output ends, a differential transformer used to detect a leak electric current, a trip apparatus that controls any contact between such flexible neutral power lines, hot line input metal sheets and the interrupter output conductor, neutral lines and hot line output ends, and a pair of flexible metal sheets placed on the top of the circuit board that are welded to the neutral lines and hot line output ends.

One end of the flexible neutral line and live hot line input metal sheets passes through the aforementioned differential transformer and is connected to the neutral line and hot line input metal sheets by a wiring screw and welded to one end of the circuit board; on the other end of the neutral lines and hot line input metal sheets, a pair of moving contacts are installed respectively, and this pair of moving contacts correspond to the pair of fixed contacts on the power output conductor described; one end of the two flexible metal sheets, together with the power output end described, are welded onto the circuit board, and there is a pair of moving contacts on the other end. This pair of moving contacts corresponds to another pair of fixed contacts on the aforementioned power output conductor, thus forming two groups and four pairs of power switches.

The aforementioned trip apparatus includes a release, a latch, a latch spring, a latch lever and a release coil.

The release is a cylindrical body, located below the reset button. The release has a longitudinally-extending, central perforation on it top; its left and right sides extend outward to form lifting arms; the aforementioned flexible power input metal sheets and flexible metal sheets are located on the upper part of the lifting arms on both sides of the release, and the locations of the moving contacts on the input metal sheets of the neutral power lines and the locations of the moving contacts on flexible metal sheets on the upper part of the sides of the release cross each other; the locations of the moving contacts on the input metal sheets of the neutral power lines and the locations of the moving contacts on another flexible metal sheet on the upper part of the sides of the release also cross each other.

Below the release, a movable latch shaped as an inverted letter "L," made of a metal material, threads through the release. On top of the latch, there is also a perforation.

Between the side wall of the release and the side wall of the latch, there is a circular groove, in which there is a latch spring; on the outside of the side wall of the latch, there is a release coil with a built-in moving iron core; the built-in iron core of the release coil directly faces the side wall of the latch.

There is a hole at the end of the top of the latch, and there is a release lever shaped like the number "7" inside the hole. The top of said release lever is located below the test button of the ground fault circuit interrupter.

The aforementioned release, latch, latch spring and release lever are connected to each other such that and they form a unit that can move freely.

Between the bottom of the release described and the circuit board, there is a flexible unlocking switch made of a flexible metal material; one end of this unlocking switch is connected to the positive pole of the direct current output by the rectification circuit on the circuit board; the other end is fastened onto the circuit board and is connected to the silicon controlled control pole that controls whether the release coil is energized through the circuit board.

Below the test button of the ground fault circuit interrupter, there is a flexible metal sheet for testing; one end of the flexible metal sheet for testing is located below the test button, and the other end is connected to the output conductor of the hot line; there is an electricity leak test resistance below the flexible metal sheet for testing for connection, and the electricity leak test resistance is welded onto the circuit board and is connected to the neutral line of the power input end.

There is a spacing shim below the moving contact of the metal sheet for the flexible power input described and the flexible metal sheet.

The use by this invention of the above technical solution not only provides this invention with protection against an electricity leak, but the instant this invention is connected to the live power line and neutral line within the wall, the ground fault circuit interrupter is automatically checked to ascertain whether it is still capable of protecting against an electricity leak and whether the ground fault circuit interrupter has come to the end of its life. When a ground fault circuit interrupter has come to the end of its life, the reset button can be prevented from being reset, so that the load output end of the ground fault circuit interrupter and the single phase, three line output plug hole on the surface of the interrupter are not energized, thus avoiding the occurrence of an accidental death by electrocution of the user in caused by a situation where a ground fault circuit interrupter has come to the end of its life or its internal component fails to work in a normal manner, but where the load output end of the ground fault circuit interrupter and the single phase, three line output plug hole on the surface of the interrupter still have a power output, leading to a leak of electricity. In addition, when a certain part or accessory inside a ground fault circuit interrupter fails, especially when the release coil fails to work in a normal manner, the test button may be pressed to forcibly cut off the power output of the interrupter using mechanical means. This invention has powerful functions, with good safety and is safe to use, thus effectively ensuring the personal safety of the user as well as the safety of the appliances.

EXAMPLES AND DETAILED DESCRIPTION OF THE INVENTION

Figure 1:
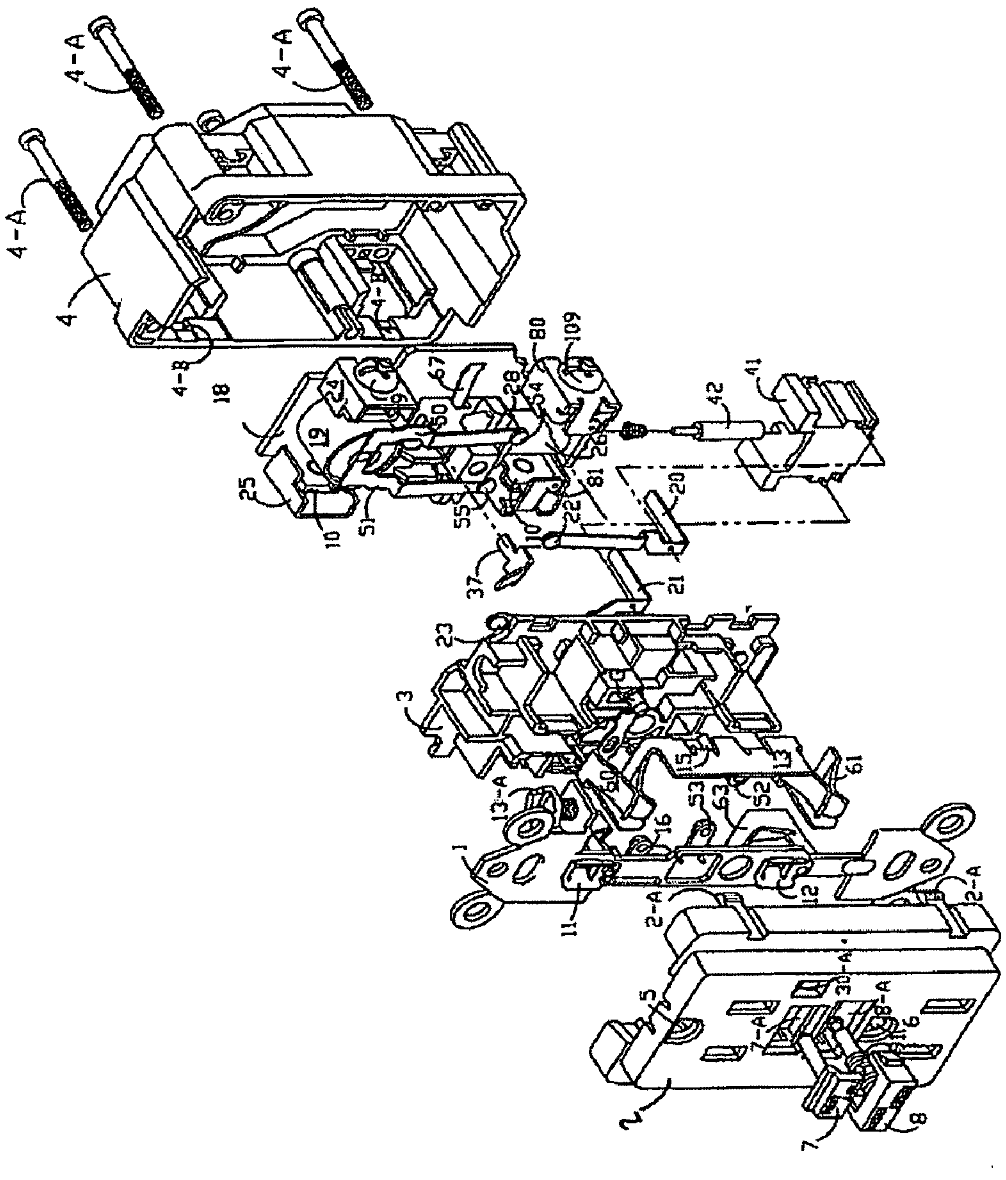
FIG. 1 is an exploded view illustrating the structure of an embodiment of this invention.

As shown in FIG. 1, the ground fault circuit interrupter disclosed by this invention mainly consists of a housing and a circuit board 18 installed inside the housing capable of achieving a ground fault circuit interrupter with/without power output and automatically testing whether the ground fault circuit interrupter has come to the end of its life.

The aforementioned housing includes a combination of upper cover 2, insulated mid-level support 3 and base 4; between upper cover 2, and mid-level support 3, there is metal grounding installation board 1; between mid-level support 3 and base 4, circuit board 18 is installed.

Figure 2:
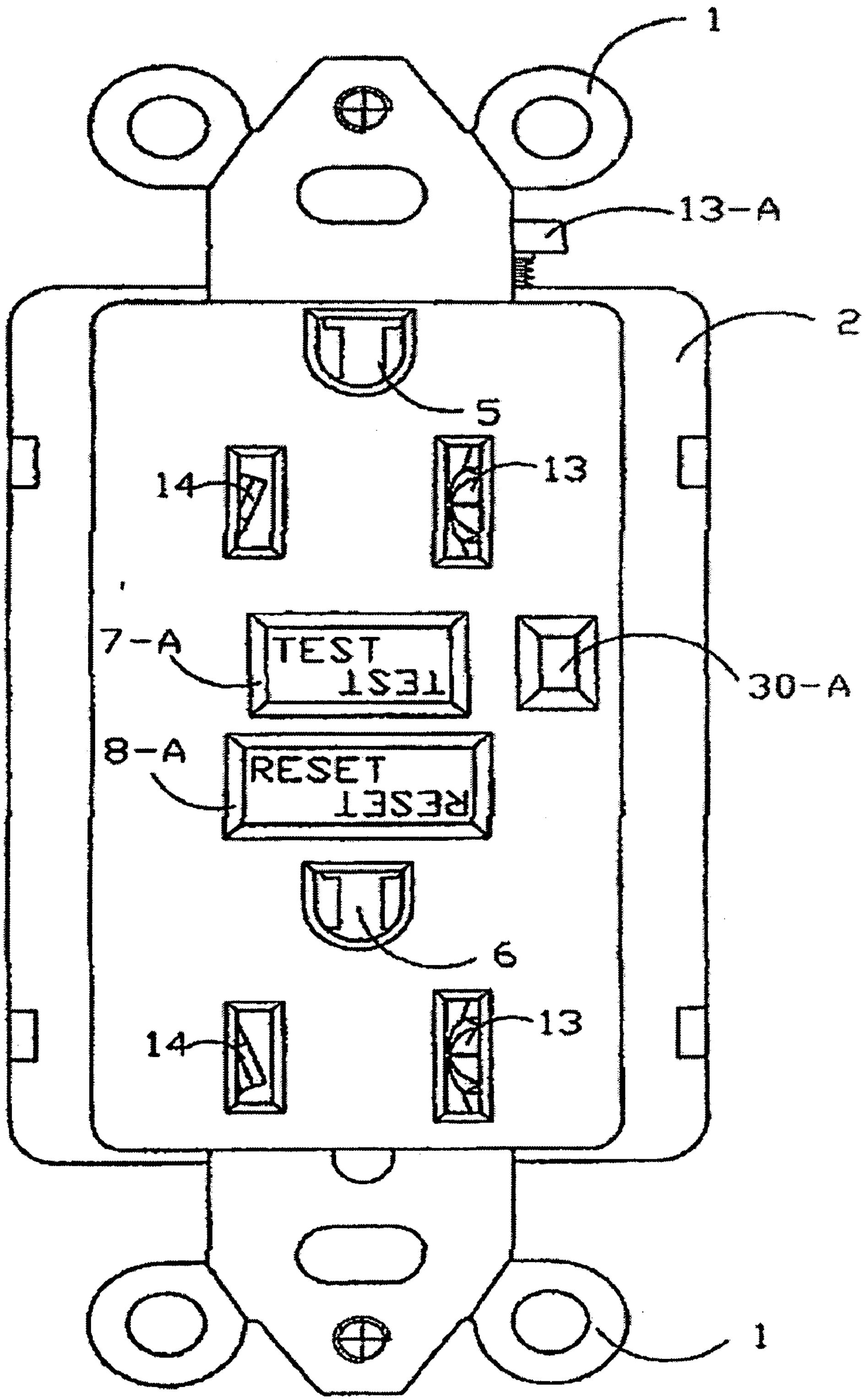
FIG. 2 is the front view of an embodiment of the present invention.

As shown in FIG. 1 and FIG. 2, power output plug holes 5 and 6, reset button hole 8-A, test button hole 7-A and status indicator hole 30-A are opened on upper cover 2. Reset button 8 and test button 7 are placed in reset button 8-A and test button hole 7-A. Reset button 8-A and test button hole 7-A thread through metal ground installation board 1 and mid-level support 3, and come into contact with the component assembly on circuit 18. Indicator light G is embedded in status indicator 30-A. On the side of upper cover 2, there four clamp hooks 2-A, to be used for fastening groove 4-B on base 4.

Metal grounding installation board 1 is connected to the earth through ground screw 13-A (as shown in FIG. 1 and FIG. 2) and cable. On metal ground installation board 1, at locations corresponding to the ground holes of power output plug holes 5 and 6 of upper cover 2, grounding vanes 11 and 12 are placed.

Figure 3:
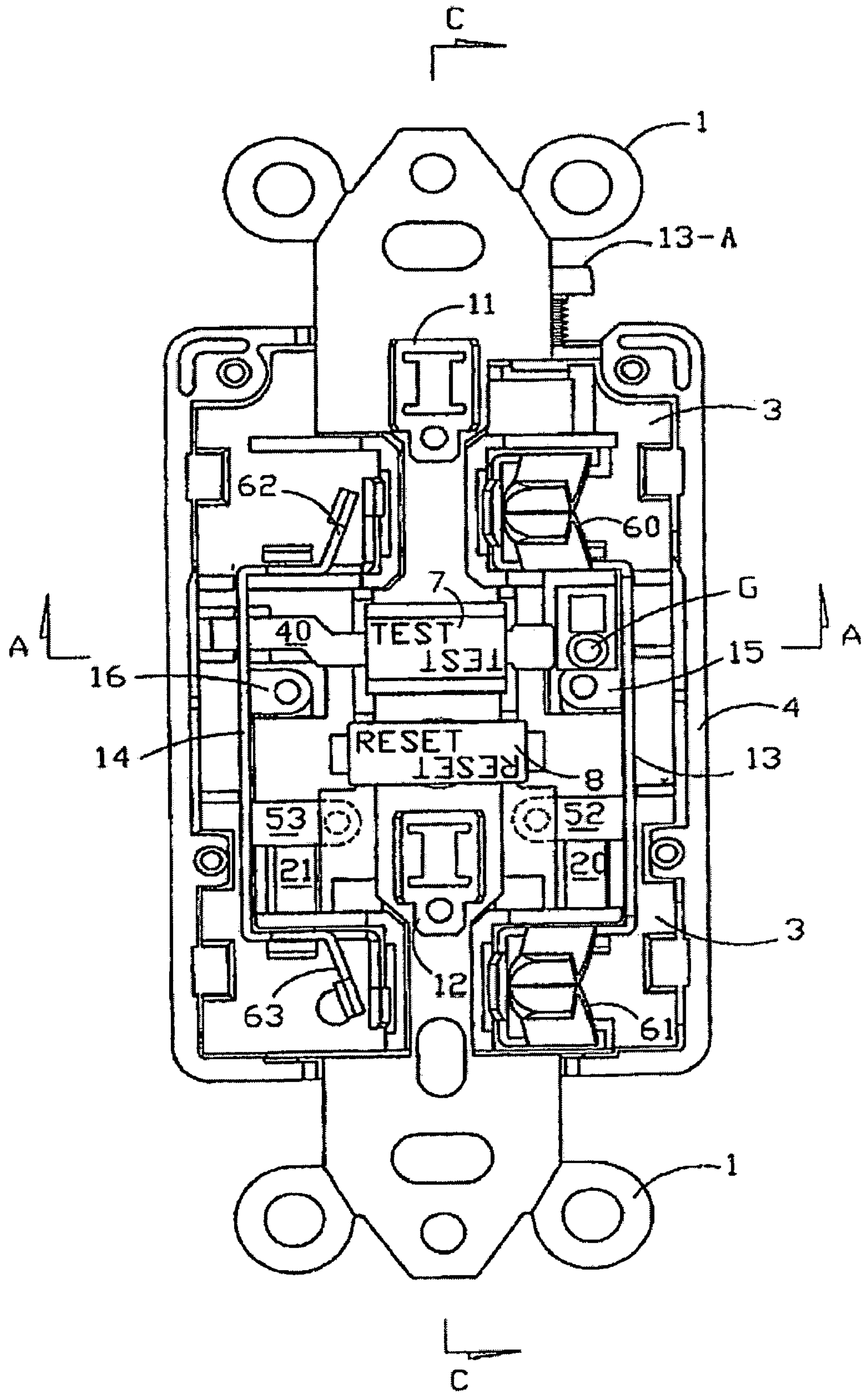
FIG. 3 is the front view of the invention with the upper cover removed.

As shown in FIG. 1 and FIG. 3, a hot power line output conductor 14 and a neutral power line output conductor 13 are installed on both sides of insulated mid-level support 3; on both sides of power output conductors 13 and 14, at locations corresponding to the neutral line holes and hot line holes of power output plug holes 5 and 6 of upper cover 2, flaky clamp winglets 60, 61, 62 and 63 are placed. Fixed contacts 15, 52 and 16 and 53 are respectively placed on power output conductors 13 and 14, thus forming two pairs of fixed contacts: 15, 16 and 52 and 53.

As shown in FIG. 1, base 4 is used to accommodate mid-level support 4 and circuit board 18. On both sides of base 4, a pair of power input wiring screws 9 and 10 and a pair of power output wiring screws 109 and 110 are symmetrically placed.

The core component assembly of this invention is circuit board 18 installed inside the housing, which is capable of energizing/or de-energizing power output wiring screws 109 and 110 on both sides of power output plug holes 5 and 6 and base 4 of upper cover 2 and automatically checking whether the ground fault circuit interrupter has come to the end of its life.

Figure 4:
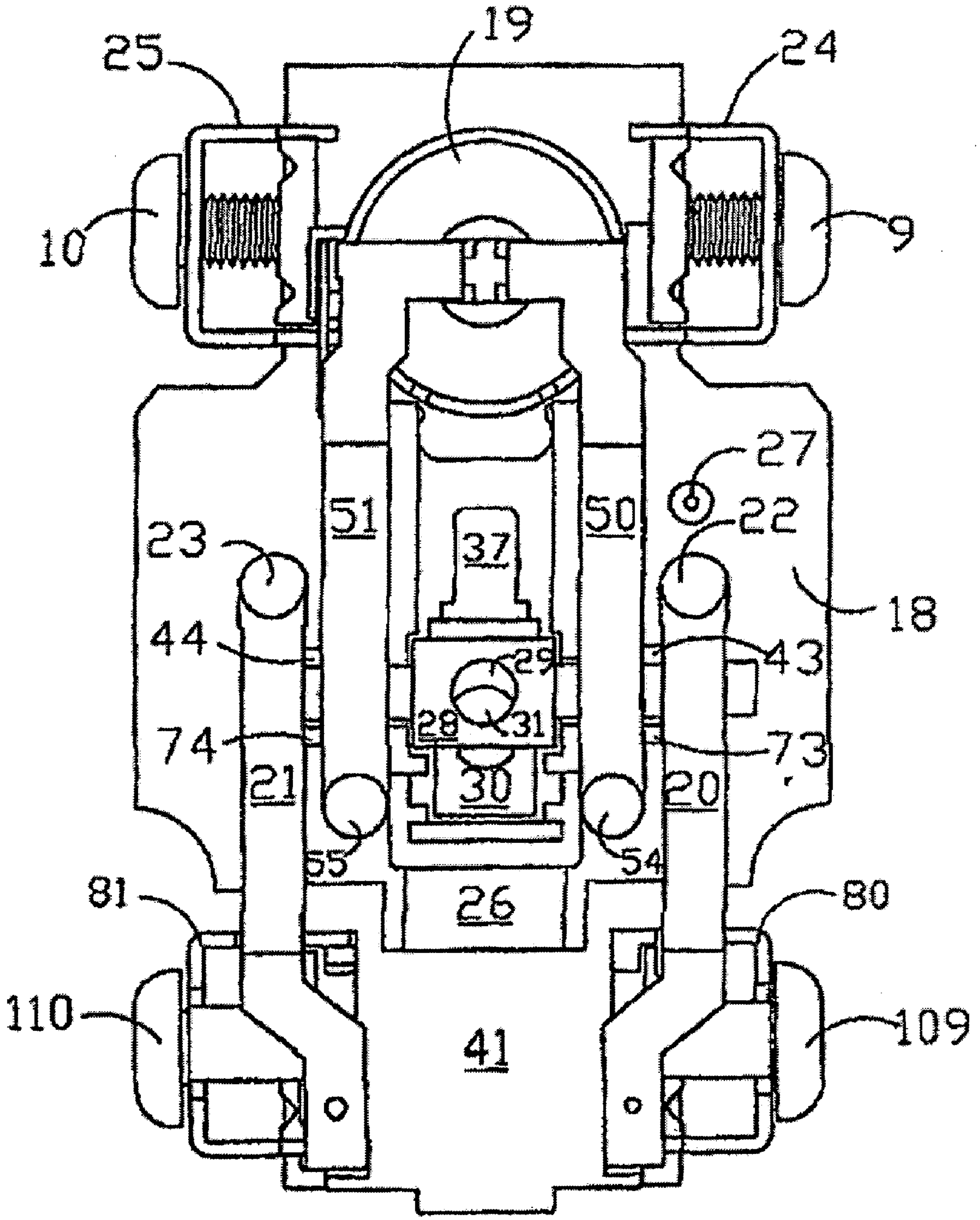
FIG. 4 is an illustration of the relationships among the parts on the circuit board according to this invention.

As shown in FIG. 1 and FIG. 4, two flexible hot power line and neutral power line input metal sheets 50 and 51 are placed on this circuit board 18. One end of flexible power input metal sheets 50 and 51 are bent 90 degrees downward, passed through differential transformer 19 and are welded onto circuit board 18, and are connected to neutral power line and hot power line input screws 9 and 10 through input terminal lugs 24 and 25; moving contacts 54 and 55 are placed respectively on the other end of flexible power input metal sheets. Moving contacts 54 and 55 respectively correspond to fixed contacts 52 and 53 on power output conductors 13 and 14 placed on mid-level support 3 (as shown in FIG. 3). Two flexible metal sheets 20 and 21 are placed above and on the sides of circuit 18; one end of flexible metal sheets 20 and 21 are welded onto the circuit board, together with neutral power line and hot line output ends 80 and 81, and are connected to power output wiring screws 109 and 110 placed on both sides of base 4; moving contacts 22 and 23 are placed on the other end. These moving contacts 22 and 23 respectively correspond to fixed contacts 15 and 16 on power output conductors 13 and 14 (as shown in FIG. 3). The aforementioned power input metal sheets 50 and 51, power output conductors 13 and 14 and the moving contacts and fixed contacts on flexible metal sheets 20 and 21 together constitute two groups and four pairs of power switches 54 and 52, 55 and 53, 22 and 15, as well as 23 and 16.

Figure 7:
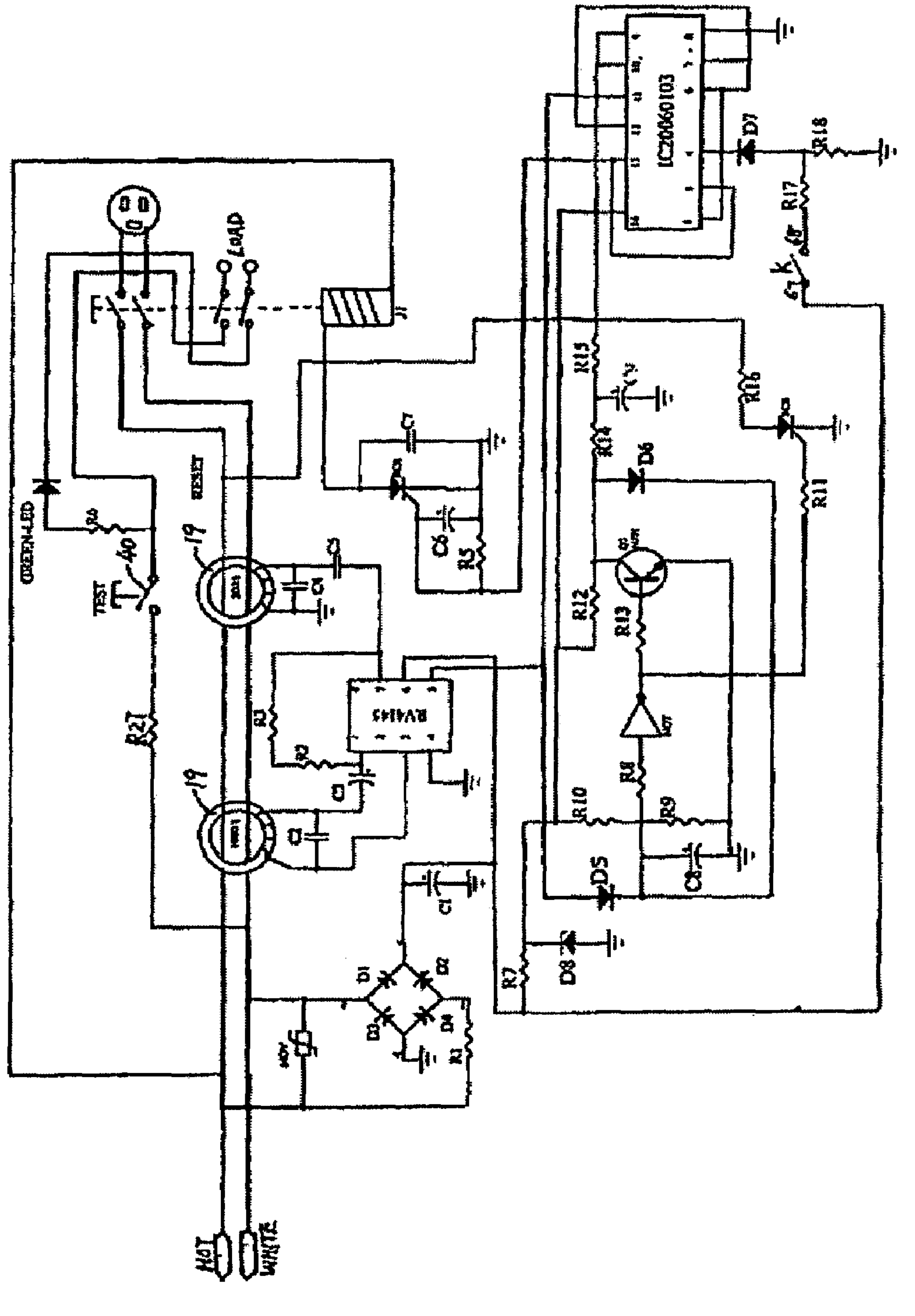
FIG. 7 illustrates a schematic view of specific circuit connections of the expiration detection circuit and other components on the circuit board.

A differential transformer 19 used for detecting any leak electric current is also placed on circuit board 18. As shown in FIG. 7, hot power line ("HOT") and neutral power line ("WHITE") pass through differential transformer 19. When there is an electric current leakage on the power supply loop, the differential transformer will output a detection signal.

Figure 5A:
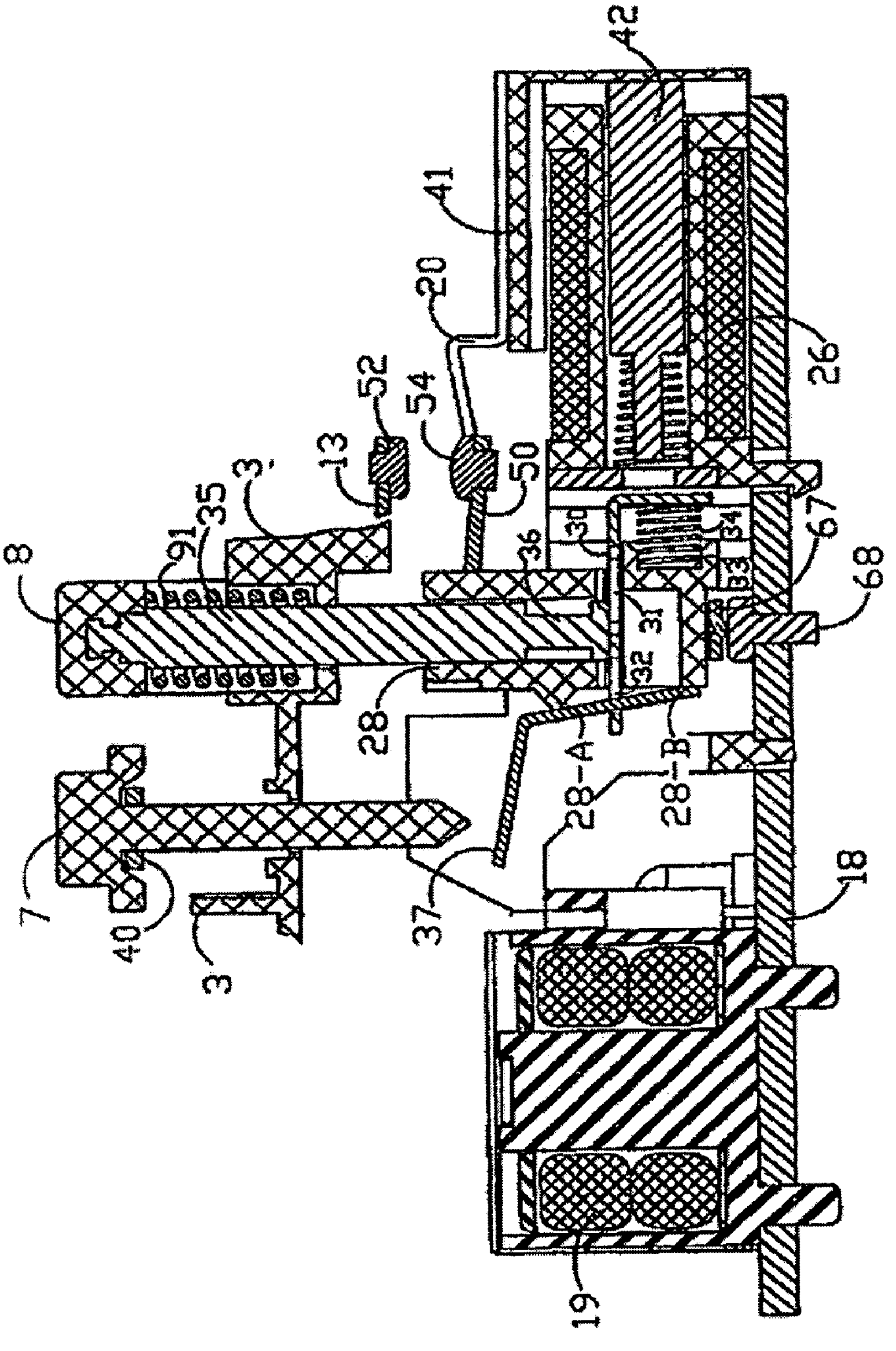
FIG. 5A is a partial cross-sectional view along the C-C line in FIG. 3, where the interrupter is illustrated to be in the reset and start configuration.

As shown in FIG. 1, FIG. 4 and FIG. 5A, a trip apparatus is also placed on circuit board 18, which may enable flexible power input metal sheets 50 and 51 and power output conductors 13 and 14 to be energized and connected/or disconnected, and which may enable flexible metal sheets 20 and 21 to be energized/or de-energized through power output conductors 13 and 14, thus enabling power output ends 80 and 81 to be energized and connected/or disconnected. Such a trip apparatus includes release 28, latch 30, latch spring 34, release lever 37 and release coil 26.

Release 28 is a cylindrical body, located below reset button 8. Its left and right sides extend outward to form lifting arms. Flexible power input metal sheets 50 and 51 and flexible metal sheets 20 and 21 are located on the upper part of the lifting arms on both sides of release 28 and can move up and down with release 28. In addition, as shown in FIG. 4, the locations of moving contacts 54 on input metal sheets 50 of the neutral power lines and the locations of moving contacts 22 on flexible metal sheets 20 on the upper part of the sides of release 28 cross each other. Similarly, the locations of moving contacts 55 on input metal sheets 51 of the hot power lines and the locations of moving contacts 23 on flexible metal sheet 21 on the upper part of the sides of release 28 also cross each other.

On top of release 28, there is a vertical, central perforation 29, which is embedded into reset guide column 35 at the bottom of reset button 8, in which reset spring 91 is slid. The column can move up and down along central perforation 29. In the lower part of reset guide column 35 and near its bottom, a circle of concave lock groove 36 is opened. In the lower part of release 28, a movable latch 30 shaped like an inverted letter "L", that is made of metal materials, passes through release 28. On top of latch 30, there is perforation 31. Between the side wall of release 28 and the inside of latch 30, there is a circular groove 33, in which there is latch spring 34. On the outside of the side wall of latch 30, there is a release coil 26, with a built-in moving iron core 42. The built-in iron core of release coil 26 directly faces the side wall of latch 30. Above release coil 26, there is a protective shield 41. One end of the mid-level support presses down on protective shield 41.

On one end of latch 30, there is a hole 32. A release lever 37 shaped like letter "L" threads through hole 32. The top of release lever 37 is below the head of test button 7, and on the side wall of release 28 near release lever 37, there is a pivot point 28-A, and release lever 37 leans against pivot point 28-A on the side wall of release 28.

Release 28, latch 30, latch spring 34 and release lever 37 join each other and form a unit that can move freely.

Figure 5B:
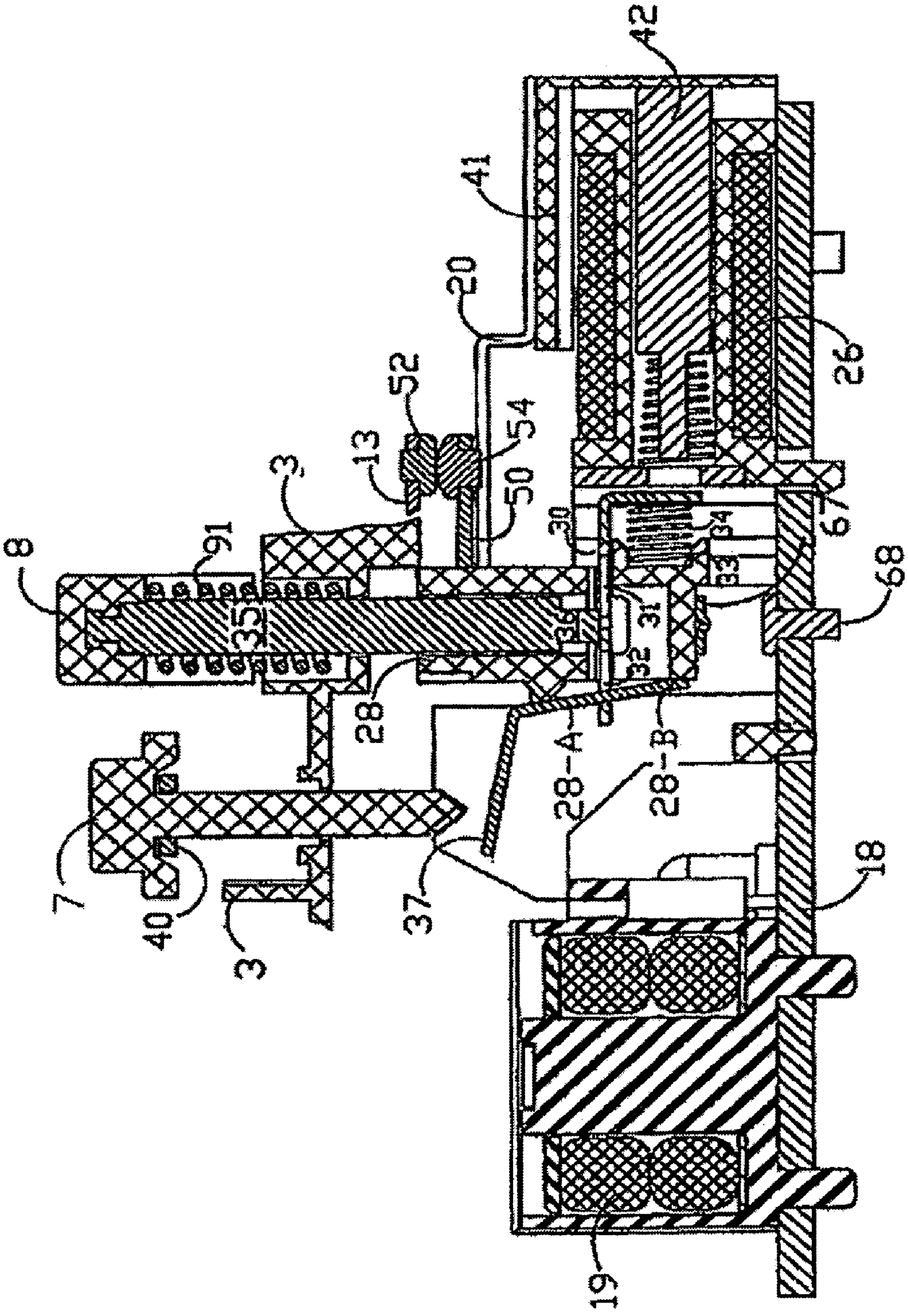
FIG. 5B is a partial cross-sectional view along the C-C line in FIG. 3, where the interrupter is illustrated to be in normal working configuration.

As shown in FIG. 5A and FIG. 7, between the bottom of release 28 and circuit board 18, there are flexible unlocking switches 67 and 68 made of a flexible metal material. As shown in FIG. 7, one end 67 of this unlocking switch is connected to the positive pole of the direct current output by the rectification circuit on the circuit board; the other end 68 is fastened onto circuit board 18 and is connected to silicon controlled rectifier SCR1 that controls whether release coil 26 is energized and generates a magnetic field through the circuit board. When reset button 8 is pressed, reset guide column 35 and release 28 are moved downward therewith, thus closing two contacts 67 and 68 on the unlocking switch. Silicon controlled rectifier SCR1 is energized, silicon controlled rectifier SCR1 is on, an electric current passes through release coil 26 and generates a magnetic field, thus attracting iron core 42 to collide with latch 30 and moving it. The bottom of reset guide column 35 threads through central perforation 31 of latch 30, as shown in FIG. 5B; due to the inertia of flexible unlocking switches 67 and 68, the unlocking switch bounces up. The two ends 67 and 68 of the unlocking switch are disconnected. Silicon controlled rectifier SCR1 has no voltage, and silicon controlled rectifier SCR1 is not on. No electric current passes through release coil 26, and the magnetic field disappears; latch spring 34 between latch 30 and release 28 moves latch 30 back and forth, thus causing central perforation 31 on latch 30 to slide into guide groove 36. Also, due to the release of spring 91 on top of reset guide column 35, release 28 is moved upward together with it, so that flexible metal sheets 50, 51, 20 and 21 on the lifting arms on both sides of release 28 move up together with it, and causing moving contacts 53 and 55 on flexible power input metal sheets 50 and 51 to come into contact with fixed contacts 52 and 53 on power output conductors 13 and 14, and power output conductors 13 and 14 are energized. Also, moving contacts 22 and 23 on flexible metal sheets 20 and 21 come into contact with fixed contacts 15 and 16 on power output conductors 13 and 14, thus causing flexible metal sheets 20 and 21 that are in contact with power output ends 80 and 81 to be energized. As shown in FIG. 5B, electric connection for a ground fault circuit interrupter from the power input end to the power output plug hole and again to the load end is achieved, that is, power output ends 80 and 81 as well as power output end plug holes 5 and 6 have power output on power output ends 80 and 81 of the ground fault circuit interrupter.

Figure 5C:
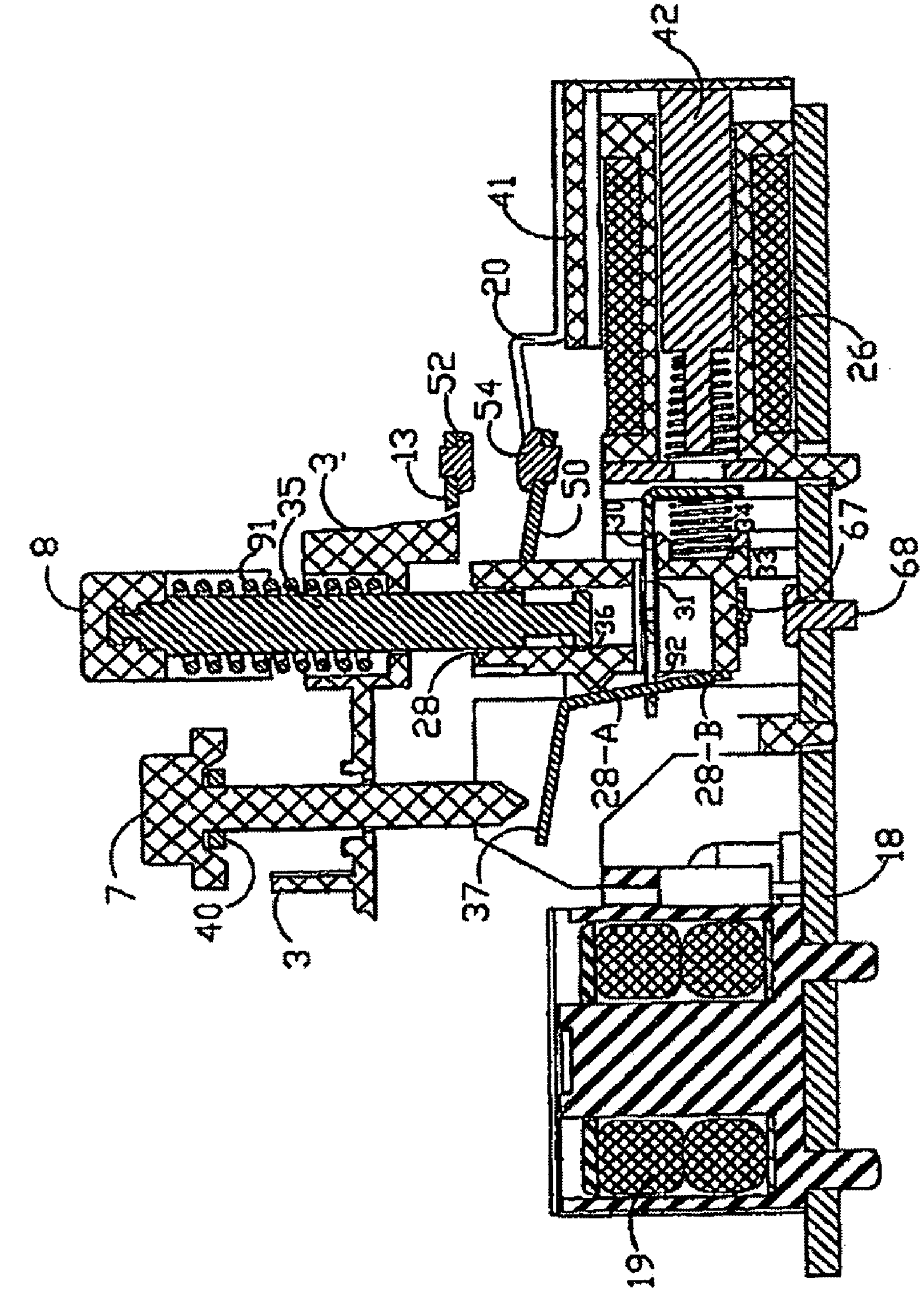
FIG. 5C is a partial cross-sectional view along the C-C line in FIG. 3, where the trip status button of the interrupter after the test button is pressed.
Figure 6:
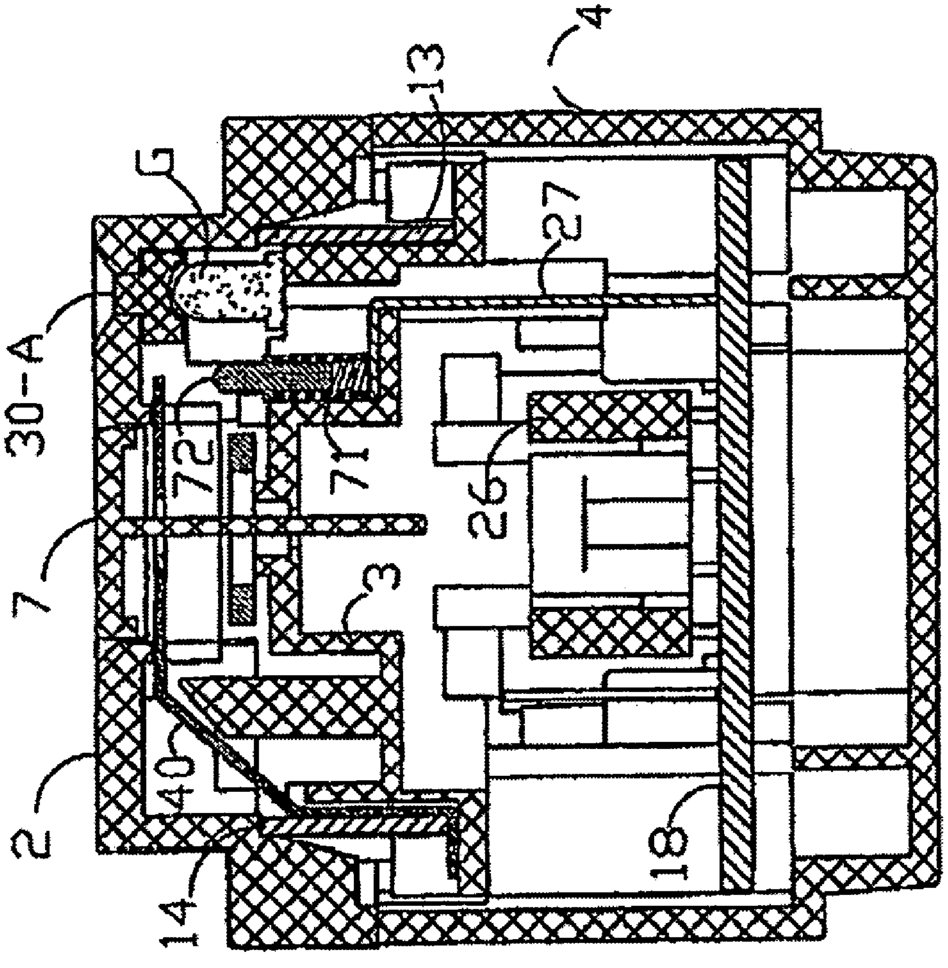
FIG. 6 is partial cross-sectional view along the A-A line in FIG. 3.

As shown in FIG. 3 and FIG. 6, below test button 7, there is a flexible metal sheet 40 for testing. One end of flexible metal sheet 40 for testing is below test button 7, and the other end is connected to hot power line output conductor 14. Below flexible metal sheet 40, there is a conductive pin 72 at some distance from flexible metal sheet 40. Conductive pin 72 is connected to electric current leak test resistance 27 through spring 71. Electric current leak test resistance 27 is welded onto the circuit board and is connected to neutral line WHITE on the power input end. As shown in FIG. 5C, FIG. 6 and FIG. 7, when the user needs to cut off the power output of the interrupter, he may press test button 7, 50 that flexible metal sheet 40 is connected to electric current leak test resistance 27, which simulates an electricity leak failure and generates an electric leak current. The electric leak current passes through hot power line output conductor 14, flexible metal sheet 40 and electric current leak test resistance 27 to the neutral line at the power output end. After differential transformer 19 and core IC1 detects this failure, a control signal is put out immediately, so that silicon controlled rectifier SCR1 is on and an electric current passes through release coil 26, which generates a magnetic field that causes iron core 42 inside to act and move latch 30. Reset guide column 35 jumps out of perforation 31 of latch 30, release 28 drops down and flexible power input metal sheets 50 and 51 drop down, disengaging their moving contacts from fixed contacts 13 and 14 on power output conductors 13 and 14. Power output conductors 13 and 14 are not energized, thus causing flexible metal sheets 20 and 21 connected to power output ends 80 and 81 not to be energized, either. Since neither power output conductors 13 and 14 nor power output ends 80 and 81 are energized, the load end, i.e., power output ends 80 and 81 and power output plug holes 5 and 6 on the surface of the interrupter have no power output.

During the work process of a ground fault circuit interrupter, when there is an electric leak on a power supply line, this invention can prevent power output of the ground fault circuit interrupter through the above structure. In addition, when the user wants to test whether ground fault circuit interrupter is intact or wants to cut off the power output of the interrupter, he may also press test button 7 and simulate a grounding failure by testing metal sheet 40 and testing resistance 27, so that release coil 26 is energized and generates a magnetic field. Thus, the power output of the ground fault circuit interrupter is cut off through the above structure.

Figure 5D:
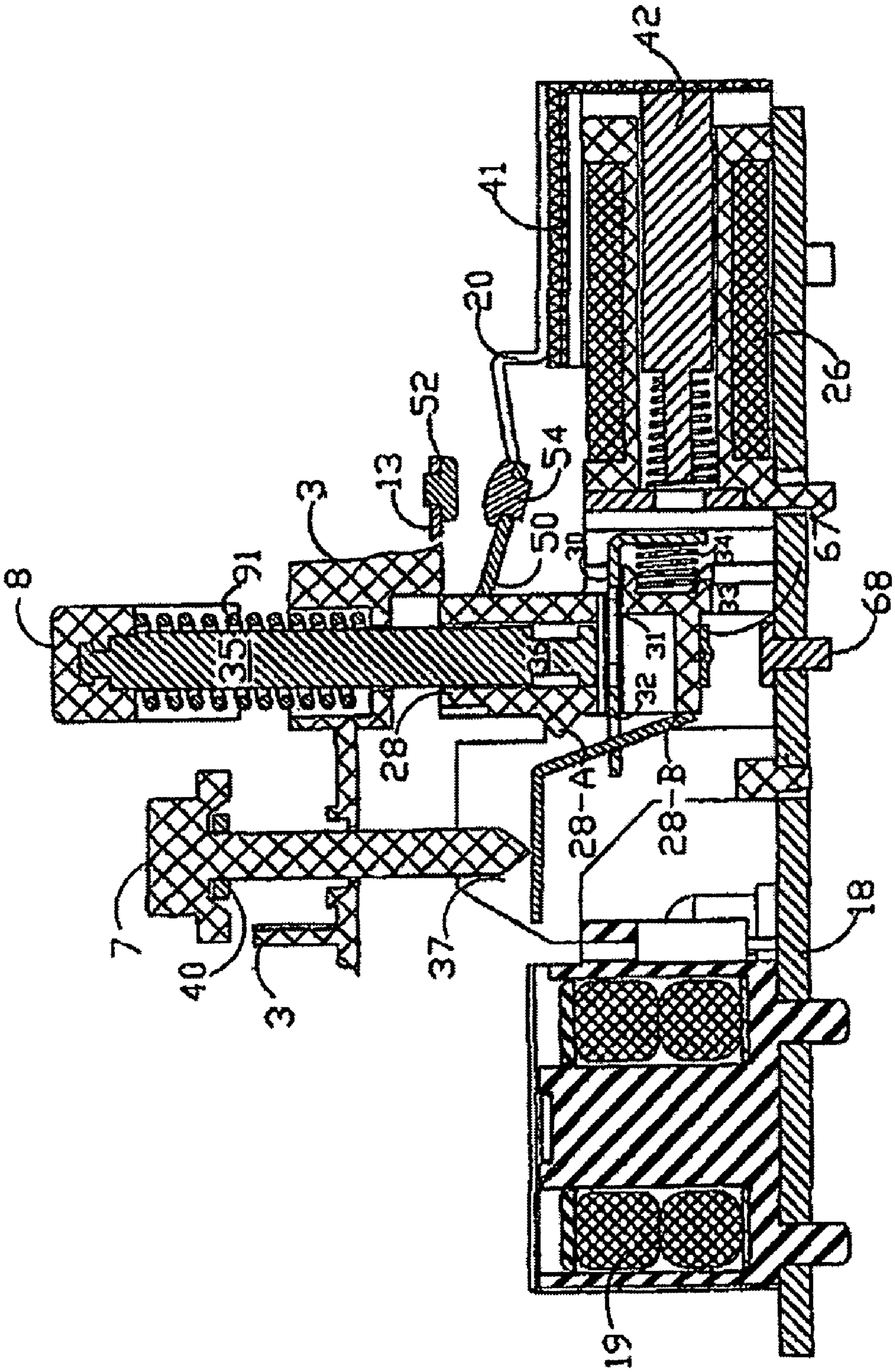
FIG. 5D is a partial cross-sectional view along the C-C line in FIG. 3, where the illustrated interrupter is forcibly released after the test button is pressed.

When a component inside a ground fault circuit interrupter fails, so that when test button 7 is pressed to simulate an electric leak and the ground fault circuit interrupter cannot be released, as shown in FIG. 5D and FIG. 6, one may keep pressing down hard on test button 7 for a mechanical release. The release process is as follows: When test button 7 is pressed, flexible metal sheet 40 is tested first for its contact with conductive pin 72. Spring 71 below conductive pin 72 comes into contact with test resistance 27, which connects the simulated electric current leak loop. The ground fault circuit interrupter cannot be released. Test button 7 keep moving downward, and its head pushes against release lever 37 to revolve downward, so that the right side wall of release lever 37 leaves pivot point 28-B on the side wall of release 28. Since release lever 37 threads through perforation 32 of latch 30, latch 30 is pulled to move left. Latch spring 34 is compressed, so that clamp groove 36 on reset guide column 35 slips out of latch hole 31. Release 28 drops down and flexible power input metal sheets 50 and 51 drop down, disengaging their moving contacts from fixed contacts 13 and 14 on power output conductors 13 and 14, thus causing flexible metal sheets 20 and 21 connected to power output ends 80 and 81 not to be energized. Neither power output conductors 13 and 14 nor power output ends 80 and 81 are energized, and the interrupter has no power output.

FIG. 7 is a specific wiring diagram for the end of life detection circuit in this invention and a wiring diagram for components on the circuit board. The working principles for the end of life detection circuit in this invention; when an alternate current voltage is added to the input end of this circuit, without operating any part, this detection circuit automatically generates a simulated leak electric current. The detection circuit begins to detect components within the ground fault circuit interrupter (hereinafter referred to as "GFCI"). At the same time, chip IC2006103 disconnects the reset start circuit consisting of a bridge rectification, a resistance, silicon controlled SCR1 and release coil SOL and the trip circuit consisting of IC (RV4145), silicon controlled SCR1 and release coil SOL; after detection is passed and no failure with any component inside the ground fault circuit interrupter is found, the detection circuit will generate an output signal, so that the internal switch of chip IC20060103 closes, the reset start circuit and trip circuit of the ground fault circuit interrupter close and the reset button can work normally. At the same time, the leak electric current automatically provided during energization is automatically eliminated. By contrast, when a failure of any component within the ground fault Circuit interrupter is found to have failed and cannot work normally, disconnection of the reset start circuit and trip circuit will continue. The reset button can never be reset, thus eliminating the possibility of being re-operated and being reset by mistake. The power output plug hole and the load end of the interrupter are never energized. This indicates that the GFCI has come to the end of its life and needs to be replaced with a new GFCI.

As shown in FIG. 4, this invention places two pairs of spacing shims 43 and 44 as well as 73 and 74 below the moving contacts of flexible power input metal sheets 50 and 51 of the flexible power input, on the coil mount of release coil 26.

Based on the above description, this invention not only provides protection against any leak electric current, but the instant invention is connected to the hot power line and neutral power line within the wall, the ground fault circuit interrupter is automatically checked to ascertain whether it is still capable of protecting against an electricity leak and whether the ground fault circuit interrupter has come to the end of its life. When the ground fault circuit interrupter has come to the end of its life, the reset button cannot be reset. The power output plug hole and load end have no power output, reminding the user to pay attention and to replace the ground fault circuit interrupter with a leak electric current. In addition, when a certain part or accessory inside a ground fault circuit interrupter fails, especially when the release coil fails to work in a normal manner, the test button may be pressed to forcibly cut off the power output of the interrupter using mechanical means. This invention has powerful functions, with good safety and is safe to use, thus effectively ensuring the personal safety of the user as well as the safety of the appliances.

We claim:

1. A circuit interrupting device containing a line side connection capable of being electrically connected to a source of electricity; a load side connection capable of being electrically connected to a load side conductor; and a user accessible load; wherein said circuit interrupting device comprises:

a housing;

a circuit board;

a trip apparatus capable of tripping said circuit interrupting device to cause electrical discontinuity between said line side connection, said load side connection, and said user accessible load when a fault occurs;

a reset button; and a two-level test button;

wherein when said circuit interrupting device is properly wired or powered, depressing said two-level test button activates a first-level test button which generates a leakage current to test whether components of said circuit interrupting device are working properly;

wherein when said components of said circuit interrupting device are functioned properly, said reset button can be reset;

wherein when one or more of said components of said circuit interrupting device are not functioned properly, said reset button cannot be reset; and wherein when said circuit interrupting device is not properly wired or powered, depressing said two-level test button does not activate said first-level test button, but a further depression of said two-level test button activates a second-level test button which mechanically trips said circuit interrupting device.

2. The circuit interrupting device according to claim 1, wherein said circuit interrupting device is a ground fault circuit interrupter.

3. The circuit interrupting device according to claim 1, wherein said components of said circuit interrupting device comprise a differential transformer, a leakage current detection chip (IC1), a silicon controlled rectifier (SCR), and a release coil.

4. The circuit interrupting device according to claim 1, wherein said fault is a ground fault or a simulated fault.

5. The circuit interrupting device according to claim 1, further comprising a first pair of flexible metal pieces and a second pair of flexible metal pieces;

wherein said first pair of flexible metal pieces is operationally connected to power source input terminals; a first end of each of said first pair of flexible metal piece passing through a differential transformer to be operationally connected to a hot input line or a neutral input line; a second end of each of said second pair of flexible metal pieces having a movable contact point;

wherein said second pair of flexible metal pieces is operationally connected to a hot power output end or a neutral power output end; each of said second pair of flexible metal pieces having a movable contact point.

6. The circuit interrupting device according to claim 5, further comprising a pair of output conductors positioned in said housing; wherein each of said output conductors contains a pair of fixed contact points;

wherein said movable contact point of each of said first pair of flexible metal pieces and said movable contact point of each of second pair of flexible metal pieces are capable of connecting/disconnecting to each of said fixed contact points of said pair of output conductors.

7. The circuit interrupting device according to claim 1, wherein said trip apparatus comprises a release, a latch, a latch spring, a release lever, and a release coil.

8. The circuit interrupting device according to claim 7, wherein said release is positioned underneath said reset button; said release having an aperture to receive a reset guide column which is coupled to said reset button; being movable in a vertical direction in said aperture;

wherein said latch containing a horizontal side extending into said release and through the aperture and a vertical side having an inner surface and an outer surface; said horizontal side of said latch having an opening therein and being movable through said aperture in a horizontal direction between an aligned position in which the opening of said latch is aligned with said reset guide column and a misaligned position in which the opening is misaligned with said reset guide column;

wherein said latch spring is located between a side wall of said inner surface of said vertical side of said latch;

wherein said release coil is positioned at said outer surface of vertical side of said latch; said release coil having an iron core;

whereby when said release coil is energized, said iron core moves towards said outer surface of said vertical side of said latch, thereby moving said latch into said aligned position.

9. The circuit interrupting device according to claim 1, wherein a flexible metal sheet is located beneath said two-level test button; a first end of said flexible metal sheet being capable of connecting/disconnecting to a conductive pin which is operationally coupled to a power input end; a second end of said flexible metal sheet being connected to an power output end;

whereby when said first-level test button is activated, said flexible metal sheet is in contact with said conductive pin to operatively generate said leakage current to test whether said components of said circuit interrupting device are working properly; and whereby as a result of said first-level test button being depressed, said reset button is popped up and ready to be reset.

10. The circuit interrupting device according to claim 8, wherein a first end of said release level is connected to a hole at said horizontal side of said latch; and wherein said second end of said release level is distanced down under a head of said two-level test button;

whereby when said second-level test button is depressed, said head of said two-level test button is pressed against said second end of said release level to cause said release and said latch to move to said aligned position so as to mechanically trip said circuit interrupting device.

11. The circuit interrupting device according to claim 1, further comprising an end of life detection circuit located at said circuit board.

12. The circuit interrupting device according to claim 11, wherein said end of life detection circuit comprises an end of life detection chip (IC2) which is capable of automatically generating a simulated fault to test whether said components of said circuit interrupting device are working properly when said circuit interrupting device is properly wired and at a tripped position;

wherein when said components of said circuit interrupting device are working properly, said IC2 sends a signal to a restart start circuit which allows said reset button to reset; and wherein when one or more of said components of said circuit interrupting device are not working properly, said IC2 sends a signal to said reset start circuit which prevents said circuit interrupting device from resetting.

13. The circuit interrupting device according to claim 12, wherein said reset start circuit comprises a bridge rectification circuit, a flexible unlocking switch, a resistance, a silicon controlled rectifier (SCR) and a release coil.

14. The circuit interrupting device according to claim 13, wherein said flexible unlocking switch comprises a first piece and a second piece; wherein said first piece of said flexible unlocking switch is located below a bottom of said release; wherein said second piece is operatively coupled to said SCR and said release coil;

whereby when said components of said circuit interrupting device are working properly, a depression of said reset button causes said flexible unlocking switch to close which turns on said SCR and energizes said release coil so as to reset said circuit interrupting device; and whereby when one or more of said components of said circuit interrupting device are not working properly, a depression of said reset button does not activate said flexible unlocking switch so that said circuit interrupting device cannot be reset.

15. The circuit interrupting device according to claim 14, wherein said flexible unlocking switch is controlled by said IC2.

* * * * *